US012142268B2

(12) United States Patent
Chauhan et al.

(10) Patent No.: US 12,142,268 B2
(45) Date of Patent: Nov. 12, 2024

(54) MULTICOMPUTER SYSTEM PROVIDING VOICE ENABLED EVENT PROCESSING

(71) Applicant: Bank of America Corporation, Charlotte, NC (US)

(72) Inventors: Sandeep Kumar Chauhan, Hyderabad (IN); Udaya Kumar Raju Ratnakaram, Telangana (IN); Nandini Rathaur, Hyderabad (IN); Vibhu Srivastava, Sangareddy (IN); Puneetha Polasa, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 708 days.

(21) Appl. No.: 17/350,394

(22) Filed: Jun. 17, 2021

(65) Prior Publication Data
US 2022/0406303 A1    Dec. 22, 2022

(51) Int. Cl.
*G07F 19/00*    (2006.01)
*G06F 3/16*    (2006.01)
*G06F 21/31*    (2013.01)
*G06Q 20/18*    (2012.01)
*G10L 15/18*    (2013.01)
*G10L 15/22*    (2006.01)
*G10L 15/30*    (2013.01)

(52) U.S. Cl.
CPC .............. *G10L 15/22* (2013.01); *G06F 3/167* (2013.01); *G06F 21/31* (2013.01); *G06Q 20/18* (2013.01); *G10L 15/18* (2013.01); *G10L 15/30* (2013.01); *G10L 2015/223* (2013.01); *G10L 2015/227* (2013.01)

(58) Field of Classification Search
USPC ........... 704/1–275; 705/64–80, 14.37–14.38, 705/35–45
See application file for complete search history.

(56) References Cited

U.S. PATENT DOCUMENTS

| 9,004,353 | B1 * | 4/2015 | Block | G06Q 20/308 |
| | | | | 382/137 |
| 9,318,108 | B2 | 4/2016 | Gruber et al. | |
| 11,354,631 | B1 * | 6/2022 | Hill | G06K 7/10712 |
| 2011/0251949 | A1 * | 10/2011 | Kay | G06Q 30/02 |
| | | | | 705/39 |

(Continued)

*Primary Examiner* — Marcellus J Augustin
(74) *Attorney, Agent, or Firm* — Banner & Witcoff, Ltd.

(57) ABSTRACT

Arrangements for voice enabled event processing are provided. In some aspects, a self-service kiosk may detect a mobile device of a user and a connection may be established between the self-service kiosk and the mobile device. The user may request, via natural language data input, processing of an event, such as a transaction. The natural language data input may be captured by the mobile device of the user and transmitted to the self-service kiosk or other processing device. The natural language input may be processed to identify the requested event. Based on the processed natural language data, an event processing request may be generated. Based on processing the event, one or more event processing commands may be generated. The event processing commands may be executed to perform one or more functions associated with completion of the event processing (e.g., distributing funds, activating a deposit receptacle, or the like).

18 Claims, 16 Drawing Sheets

(56) References Cited

U.S. PATENT DOCUMENTS

| | | | |
|---|---|---|---|
| 2014/0331131 A1* | 11/2014 | DeSellem | G07F 9/009 |
| | | | 715/708 |
| 2015/0195334 A1* | 7/2015 | Chew | G07F 9/001 |
| | | | 715/740 |
| 2017/0300882 A1* | 10/2017 | Crooks | G07F 19/206 |
| 2020/0019428 A1* | 1/2020 | Shrey | H04W 12/06 |
| 2020/0103020 A1* | 4/2020 | Peterson | H04J 3/125 |

* cited by examiner

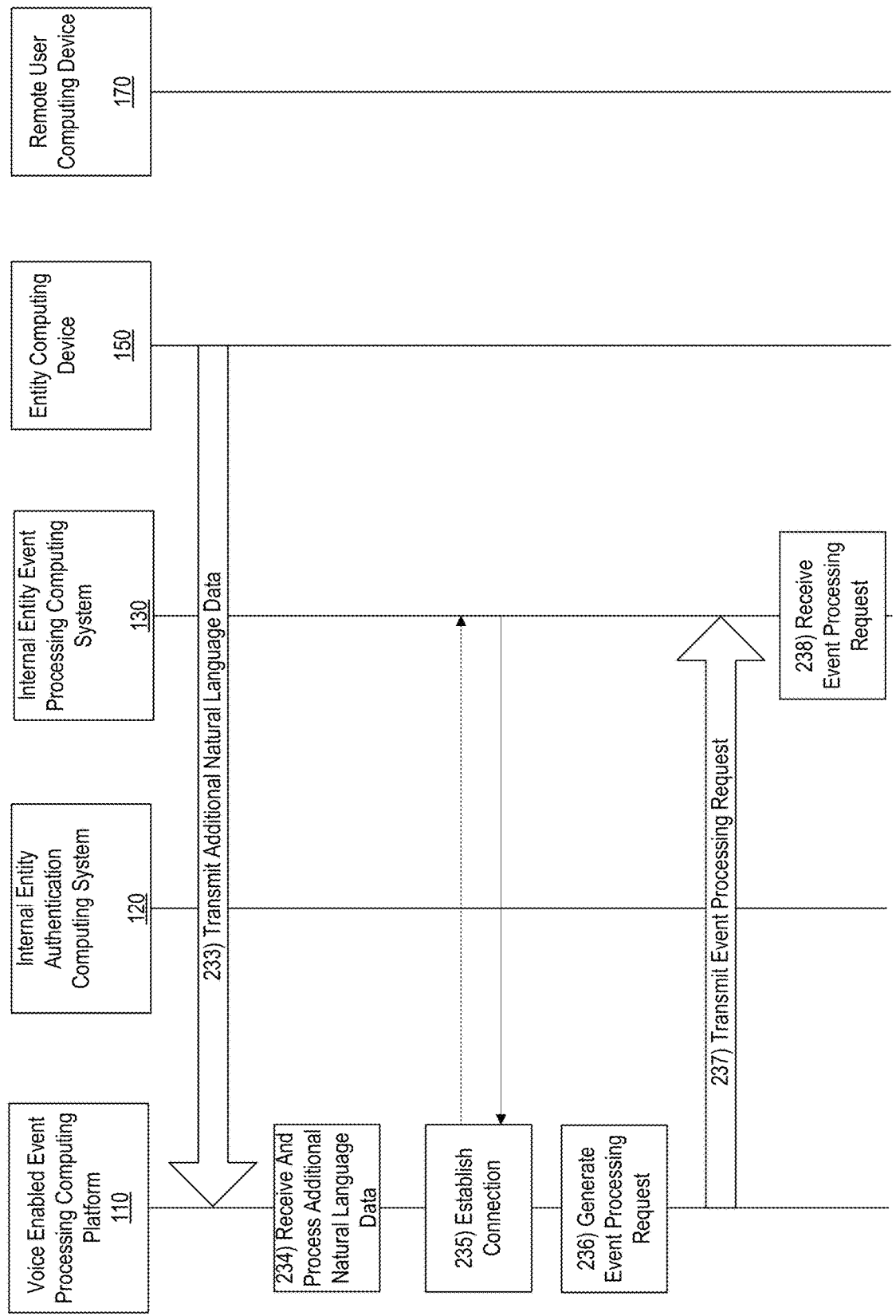

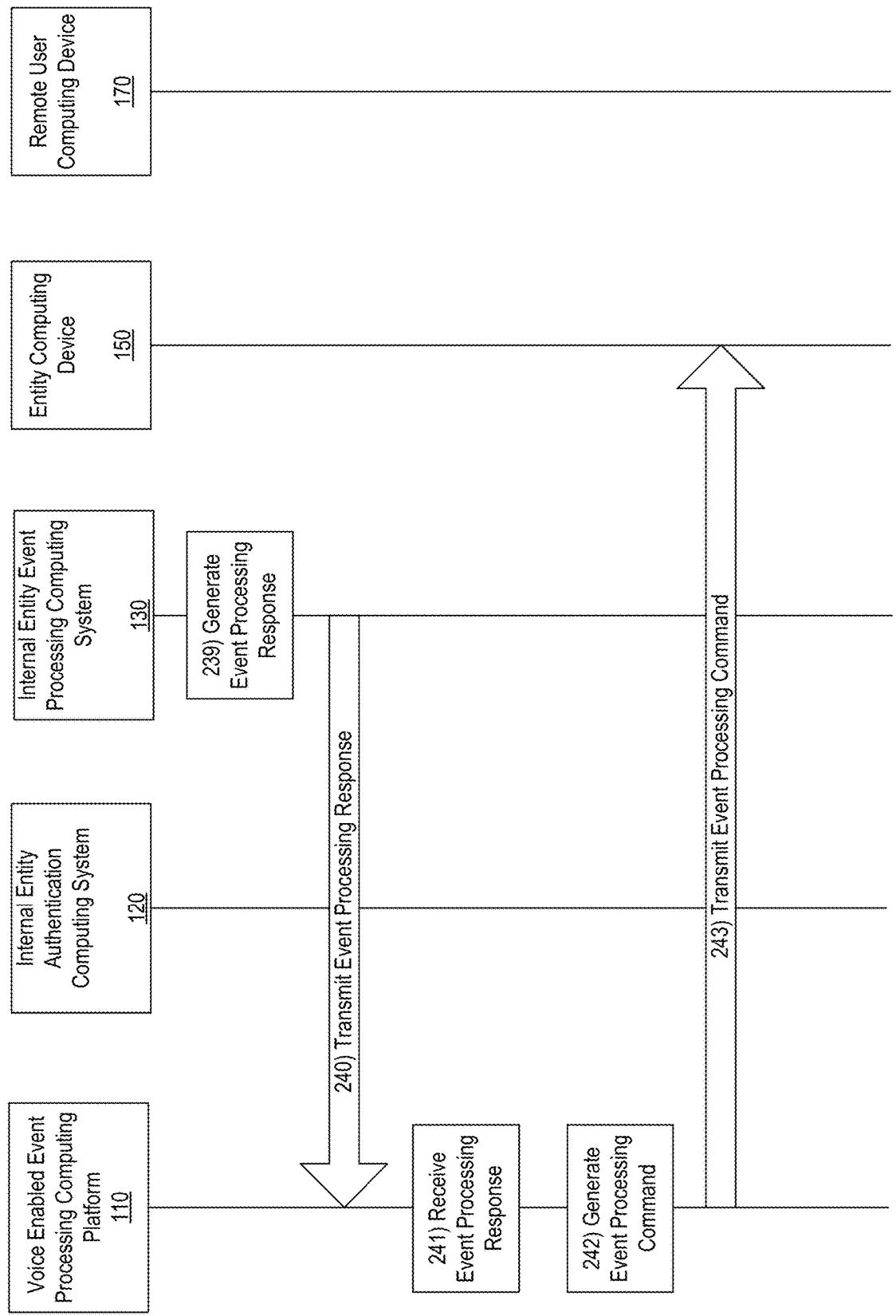

MULTICOMPUTER SYSTEM PROVIDING VOICE ENABLED EVENT PROCESSING

BACKGROUND

Aspects of the disclosure relate to electrical computers, systems, and devices performing voice enabled event processing functions.

Self-service transaction processing has become increasingly popular in recent years. For instance, systems and devices such as automated teller machines (ATMs), automated teller assistants (ATAs) and the like, have become more common and are increasingly used to process events, including transactions such as deposits, withdrawals, check cashing, balance transfers, and the like. However, because of the popularity of these self-service kiosks, heightened concern about hygiene associated with contact with these devices (e.g., touch screens, keypads, and the like) may be an issue with one or more users. Accordingly, arrangements that enable use of a voice enabled event processing between a user device and the self-service kiosk would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated providing voice enabled event processing.

In some aspects, a self-service kiosk may detect a mobile device of a user. For instance, signals emitted from a mobile device may be detected by a self-service kiosk (or vice versa) when the mobile device is within a predefined range of the self-service kiosk. In some examples, a connection may be established between the self-service kiosk and the mobile device of the user. The user may request, via natural language data input, processing of an event, such as a transaction. The natural language data input may be captured by the mobile device of the user and transmitted to the self-service kiosk or other processing device. The natural language input may be processed to identify the requested event.

In some examples, the natural language data may be evaluated to determine whether all information is available or whether additional information is needed. If additional information is needed, a user interface including a request for additional information may be generated and displayed on a display of the self-service kiosk. The user may provide additional natural language data to the mobile device which may then be transmitted for additional processing.

Based on the processed natural language data, an event processing request may be generated. Processing the event may include modifying an account balance, modifying account ledgers, and the like. Based on processing the event, one or more event processing commands may be generated. The event processing commands may be executed to perform one or more functions associated with completion of the event processing (e.g., distributing funds, activating a deposit receptacle, or the like).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for implementing voice enabled event processing functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, self-service event or transaction processing is becoming increasingly popular. However, as users become more conscious of hygiene issues associated with devices accessible to the public, it may be advantageous to provide non or limited contact self-service event processing options.

Accordingly, aspects described herein include voice enabled event processing functions. A user may use a mobile device, such as a smartphone, tablet, or the like, to capture natural language data and transmit the data to a self-service kiosk or other device for processing. Based on the processed natural language data, an event for processing may be identified and one or more instructions or commands may be generated causing the self-service kiosk to execute functions to complete the event.

In some examples, additional information may be requested from the user. Accordingly, one or more user interfaces requesting the additional information may be generated and displayed on a display of the self-service kiosk. In response to displaying the user interface, a user may provide additional natural language data to the mobile device that includes the requested additional data. This data may be transmitted for processing and used to process the event, generate event processing instructions or commands, and the like.

These and various other arrangements will be discussed more fully below.

Figure 1A:
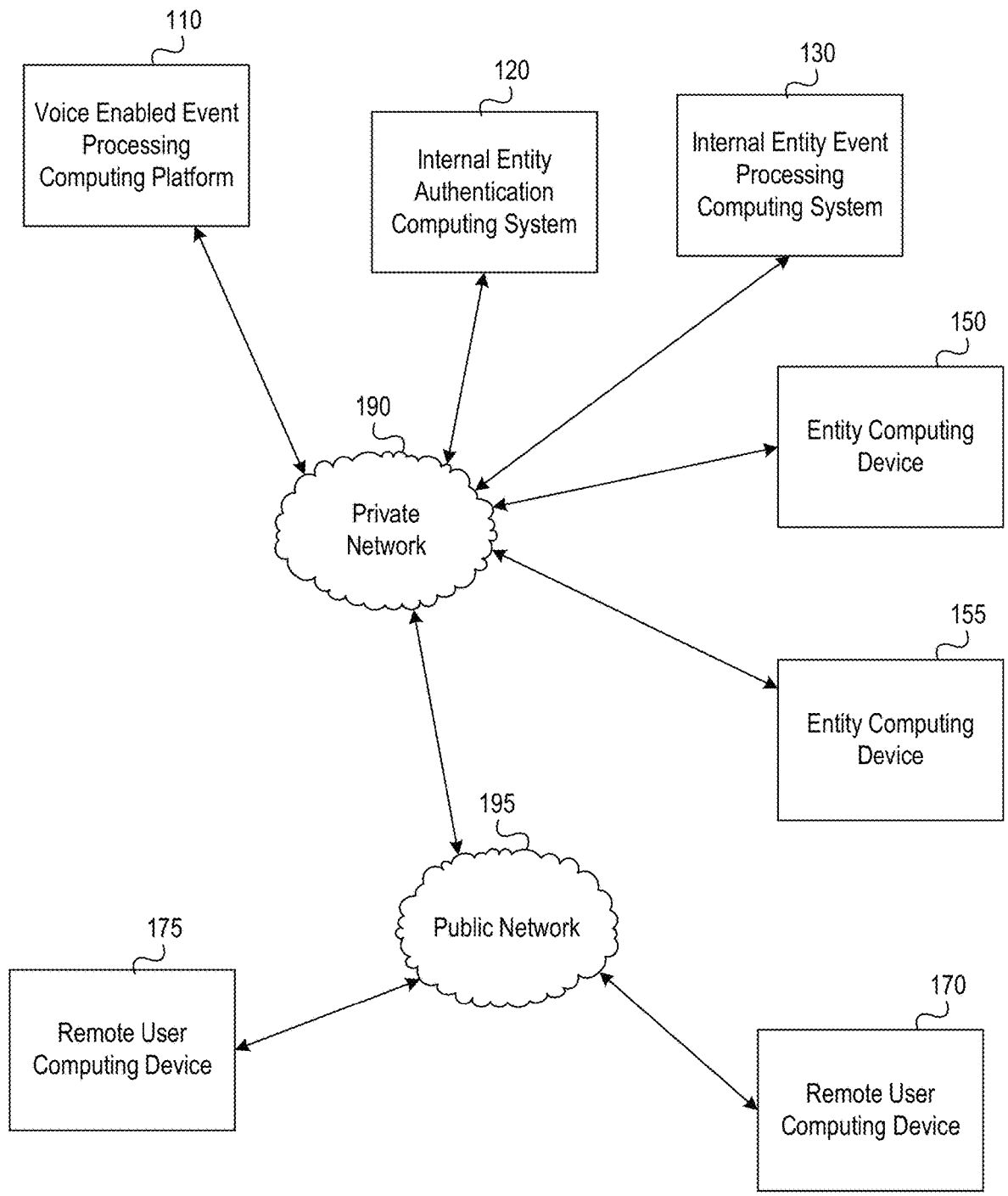
FIGS. 1A and 1B depict an illustrative computing environment for implementing voice enabled event processing functions in accordance with one or more aspects described herein.
Figure 1B:
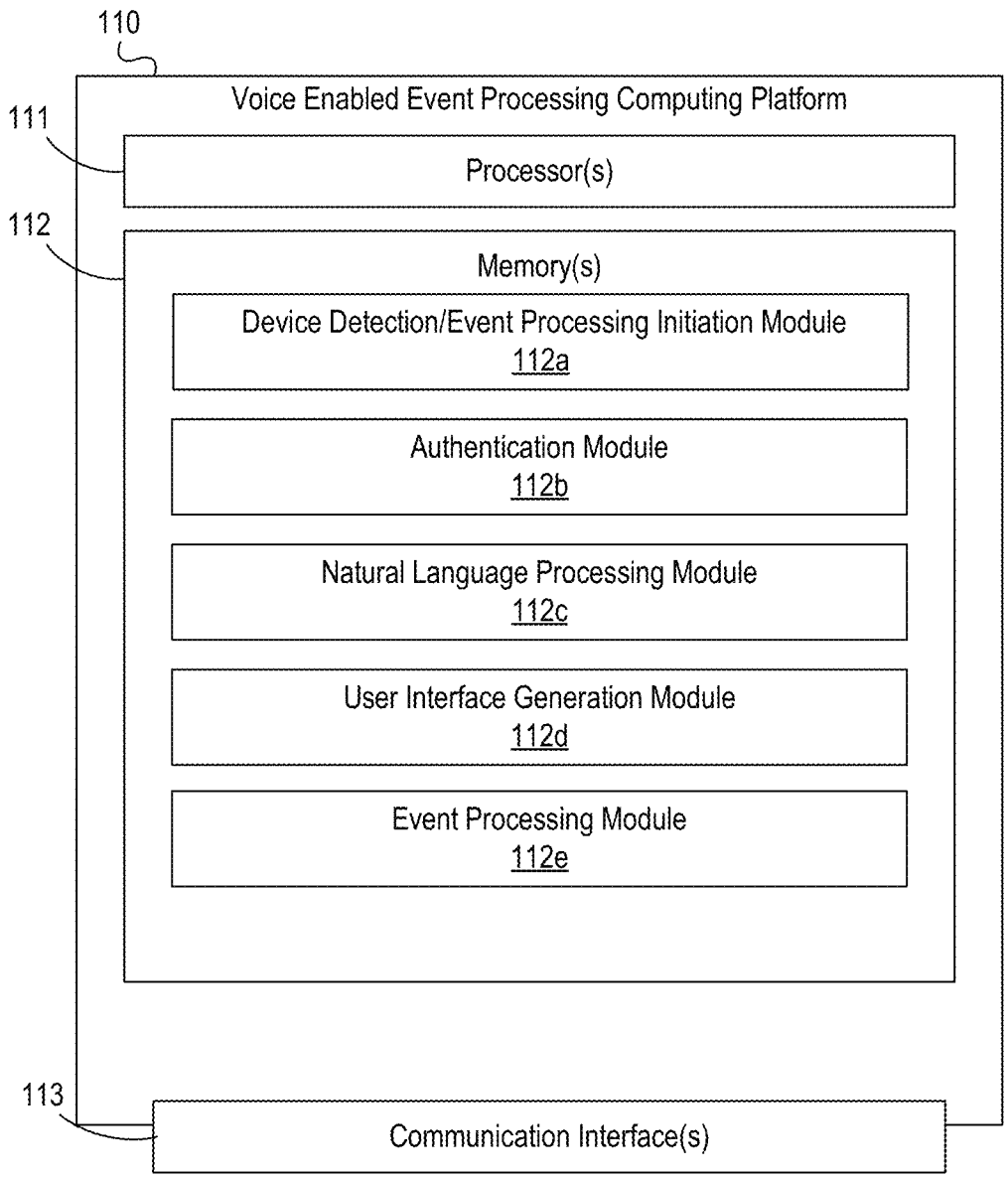

FIGS. 1A-1B depict an illustrative computing environment for implementing and using voice enabled event processing functions in accordance with one or more aspects described herein. Referring to FIG. 1A, computing environment 100 may include one or more computing devices and/or other computing systems. For example, computing environment 100 may include voice enabled event processing computing platform 110, internal entity authentication computing system 120, internal entity event processing computing system 130, a first entity computing device 150, a second entity computing device 155, a first remote user computing device 170, and a second remote user computing device 175. Although two entity computing devices 150, 155 and two remote user computing devices 170, 175 are shown, more or fewer devices may be used with the system without departing from the invention.

Voice enabled event processing computing platform 110 may be configured to provide intelligent, dynamic voice enabled event processing functions. For instance, voice enabled event processing computing platform 110 may facilitate or enable voice or natural language based event processing between a user device, such as a mobile device (e.g., remote user computing device 170, remote user computing device 175) and, for instance, a self-service kiosk, such as an automated teller machine (ATM), automated teller assistant (ATA), or the like (e.g., entity computing device 150, entity computing device 155, or the like). In some examples, the entity computing device 150 may detect a user mobile device, such as remote user computing device 170. Additionally or alternatively, the user may request, via the remote user computing device 170, a connection with the entity computing device 150. Based on the detection or request, a connection may be established between remote user computing device 170 and entity computing device 150. In some examples, the connection may be established via near-field communication, Bluetooth™, or the like.

After establishing a connection, the voice enabled event processing computing platform 110 may enable or activate voice processing functions. In some examples, that may include establishing a connection between the voice enabled event processing computing platform 110 and the entity computing device 150. In some examples, voice enabled event processing computing platform 110 may be part of a same device as entity computing device 150. In other examples, voice enabled event processing computing platform 110 may be a separate physical device from entity computing device 150.

After establishing communication between voice enabled event processing computing platform 110 and entity computing device 150, a user may request processing of an event. For instance, the user may provide voice or natural language input to remote user computing device 170. In some examples, the natural language input may be captured via an application downloaded to and executing on the remote user computing device 170. The natural language input may be transmitted, e.g., via the entity computing device 150, to the voice enabled event processing computing platform 110.

In some examples, a user may be authenticated. For instance, if a user is logged into an application executing on remote user computing device 170 that is capturing natural language data, the user may be authenticated based on that login (e.g., voice enabled event processing computing platform 110 may confirm login to the application, or the like). Additionally or alternatively, authentication data may be requested from the user. For instance, a username and password, personal identification number, or the like, may be requested from the user. The authenticating data may be provided via voice or natural language input to the remote user computing device 170 and transmitted, via the entity computing device 150 to the voice enabled event processing computing platform 110. The user may then be authenticated (e.g., based on data retrieved from internal entity authentication computing system 120).

The user may then provide voice or natural language input identifying the event for processing. For instance, the user may say "withdraw $100." This natural language data may be received by the remote user computing device 170 and transmitted to the voice enabled event processing computing platform 110. The voice enabled event processing computing platform 110 may then process the event. In some examples, processing the event may include establishing connections with other entity systems, such as internal entity event processing computing system 130. Accordingly, the event may be validated and processed. The voice enabled event processing computing platform 110 may then generate and transmit an instruction causing execution of the event at the entity computing device 150. For instance, the voice enabled event processing computing platform 110 may generate and transmit an instruction causing the entity computing device 150 (e.g., ATM, ATA, or the like) to dispense $100 to complete the event processing.

Internal entity authentication computing system 120 may be one or more computing devices, systems, or the like associated with the entity or enterprise organization implementing the voice enabled event processing computing platform 110. For instance, internal entity authentication computing system 120 may be a system internal to the enterprise organization and configured to store authentication data associated with a plurality of users. In some examples, users may provide authentication data, such as username and password, personal identification number, biometric data, or the like, to the enterprise organization when registering with the enterprise organization. This data may be stored, for example, by internal entity authentication computing system 120 and retrieved to authenticate one or more users. In some examples, the authentication data may be received during a registration process associated with use of a mobile application (e.g., upon downloading the mobile application, the user may provide authentication data) executing on the mobile device of the user. In some examples, internal entity authentication computing system 120 may receive and/or store an indication of a user being logged into the mobile application. This information may, in some examples, be used to authenticate the user.

Internal entity event processing computing system 130 may be one or more computing devices, systems, or the like associated with the entity or enterprise organization implementing the voice enabled event processing computing platform 110. For instance, internal entity event processing computing system may be a system internal to the enterprise organization and hosting or executing one or more applications configured to process events, such as transactions. For instance, the internal entity event processing computing system 130 may host or execute applications storing user account data, modifying account data (e.g., by updating an account ledger) to reflect an accurate balance in an account, or the like.

Entity computing device 150 and entity computing device 155 may be one or more computing devices associated with the enterprise organization. In some examples, entity computing device 150 and/or entity computing device 155 may be or include a self-service kiosk, such as an ATM, ATA or the like connected to or in communication with voice enabled event processing computing platform 110.

Remote user computing device 170 and/or remote user computing device 175 may be computing devices operated by one or more customers or users of the enterprise organization to request event processing (e.g., via one or more voice or natural language commands). For instance, remote user computing device 170 and/or remote user computing device 175 may be a user computing device, such as a smart phone, tablet, wearable device, or the like, having one or more applications downloaded thereto and/or executing thereon.

Computing environment 100 also may include one or more computing platforms. For example, and as noted above, computing environment 100 may include voice enabled event processing computing platform 110. As illustrated in greater detail below, voice enabled event processing computing platform 110 may include one or more computing devices configured to perform one or more of the functions described herein. For example, voice enabled event processing computing platform 110 may include one or more computers (e.g., laptop computers, desktop computers, servers, server blades, or the like).

As mentioned above, computing environment 100 also may include one or more networks, which may interconnect one or more of voice enabled event processing computing platform 110, internal entity authentication computing system 120, internal entity event processing computing system 130, entity computing device 150, entity computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, voice enabled event processing computing platform 110, internal entity authentication computing system 120, internal entity event processing computing system 130, entity computing device 150, and entity computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect voice enabled event processing computing platform 110, internal entity authentication computing system 120, internal entity event processing computing system 130, entity computing device 150, entity computing device 155, and one or more other computing devices and/or computer systems that are used by, operated by, and/or otherwise associated with the organization. Public network 195 may connect private network 190 and/or one or more computing devices connected thereto (e.g., voice enabled event processing computing platform 110, internal entity authentication computing system 120, internal entity event processing computing system 130, entity computing device 150, entity computing device 155) with one or more networks and/or computing devices that are not associated with the organization. For example, remote user computing device 170 and/or remote user computing device 175, might not be associated with an organization that operates private network 190 (e.g., because remote user computing device 170 and/or remote user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170 and/or remote user computing device 175 to private network 190 and/or one or more computing devices connected thereto (e.g., voice enabled event processing computing platform 110, internal entity authentication computing system 120, internal entity event processing computing system 130, entity computing device 150, entity computing device 155).

Referring to FIG. 1B, voice enabled event processing computing platform 110 may include one or more processors 111, memory 112, and communication interface 113. A data bus may interconnect processor(s) 111, memory 112, and communication interface 113. Communication interface 113 may be a network interface configured to support communication between voice enabled event processing computing platform 110 and one or more networks (e.g., private network 190, public network 195, or the like). Memory 112 may include one or more program modules having instructions that when executed by processor(s) 111 cause voice enabled event processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of voice enabled event processing computing platform 110 and/or by different computing devices that may form and/or otherwise make up voice enabled event processing computing platform 110.

For example, memory 112 may have, store and/or include device detection/event processing initiation module 112a. Device detection/event processing initiation module 112a may store instructions and/or data that may cause or enable the voice enabled event processing computing platform 110 to receive an indication that a device has been detected by, for instance, a self-service kiosk and/or that a request for event processing has been detected by the self-service kiosk. In some examples, the indication may include an indication that a connection has been established between the device, such as remote user computing device 170, and the self-service kiosk, such as entity computing device 150. In some examples, the connection may be established via near field communication, Bluetooth™, or the like.

Detecting a device and/or receiving a request for event processing may cause the voice enabled event processing computing platform 110 to initiate or activate one or more functions associated with voice enabled event processing.

Voice enabled event processing computing platform 110 may further have, store and/or include authentication module 112b. Authentication module 112b may store instructions and/or data that may cause or enable voice enabled event processing computing platform 110 to authenticate a user requesting event processing. For instance, the voice enabled event processing computing platform 110 may receive data (e.g., via the connection between the device and the self-service kiosk) indicating that a user is logged into a mobile application executing on the mobile device. Based on the indication that the user is logged into that application, the user may be authenticated. Additionally or alternatively, detecting the user login to the application may provide a first factor of authentication and a second factor of authentication may then be requested from the user (e.g., username and password, PIN, or the like). In some examples, the second form of authentication may be received via natural language captured by the application executing on the mobile device and transmitted, via the self-service kiosk, to the voice enabled event processing computing platform 110. Additionally or alternatively, authentication information may be requested from the user.

In examples in which authentication is requested from the user (e.g., as authentication data, as a second factor, or the like) authentication response data may be received from the user or user device and compared to pre-stored authentication data (e.g., stored, for instance, in internal entity authentication computing system 120 and retrieved therefrom). Further, in examples in which the user login to the application on the mobile device is used as at least one form of authentication, the login data, device data, or the like, may be authenticated and/or compared to pre-stored data retrieved by the authentication module 112*b* from the internal entity authentication computing system 120.

Voice enabled event processing computing platform 110 may further have, store and/or include natural language processing module 112*c*. Natural language processing module 112*c* may store instructions and/or data that may cause or enable the voice enabled event processing computing platform 110 to receive natural language data from the user (e.g., captured via an application executing on the user device (e.g., remote user computing device 170) and transmitted to the voice enabled event processing computing platform 110 via the self-service kiosk (e.g., entity computing device 150). The natural language data may be received and analyzed, translated to text, or the like, to identify an event requested by the user (e.g., withdrawal, deposit, transfer, balance inquiry, or the like) and generate response data. In some examples, generating the response data may include generating one or more user interfaces requesting additional information from the user. Accordingly, voice enabled event processing computing platform 110 may further have, store and/or include user interface generation module 112*d* that may store instructions and/or data that may cause or enable the voice enabled event processing computing platform 110 to generate one or more user interfaces. The user interfaces may be transmitted to the self-service kiosk (e.g., entity computing device 150) and displayed on a display of the device. The user may then provide natural language response data via the remote user computing device (e.g., the user may provide an answer to a question presented via the user interface, provide additional information requested via the user interface, or the like, as natural language to the application executing on the remote user computing device 170).

Any additional information received from the user may be processed by the natural language processing module 112*c*. Once the necessary information to process the event has been received, event processing module 112*e* may connect to or communicate with internal entity event processing computing system 125 to process the requested event. Processing the requested event may include transmitting event details to the internal entity event processing computing system 125, receiving, from the internal entity event processing computing system 125 an indication that the event has been processed, or the like. Responsive to receiving the indication that the event has been processed, event processing module 112*e* may generate one or more instructions or commands to execute one or more functions by the self-service kiosk (e.g., internal computing device 150). For instance, the event processing module 112*e* may generate one or more instructions or commands to execute functions to complete the event for the user. Instructions may include an instruction to distribute funds being withdrawn, an instruction to receive deposit items, or the like. The instructions may be transmitted to the self-service kiosk (e.g., entity computing device 150) and executed, thereby causing one or more functions of the self-service kiosk to execute (e.g., funds to be distributed, receptacles for receiving deposits to open, or the like).

FIGS. 2A-2I depict one example illustrative event sequence for implementing and using voice enabled event processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2I may be performed in real-time or near real-time.

Figure 2A:
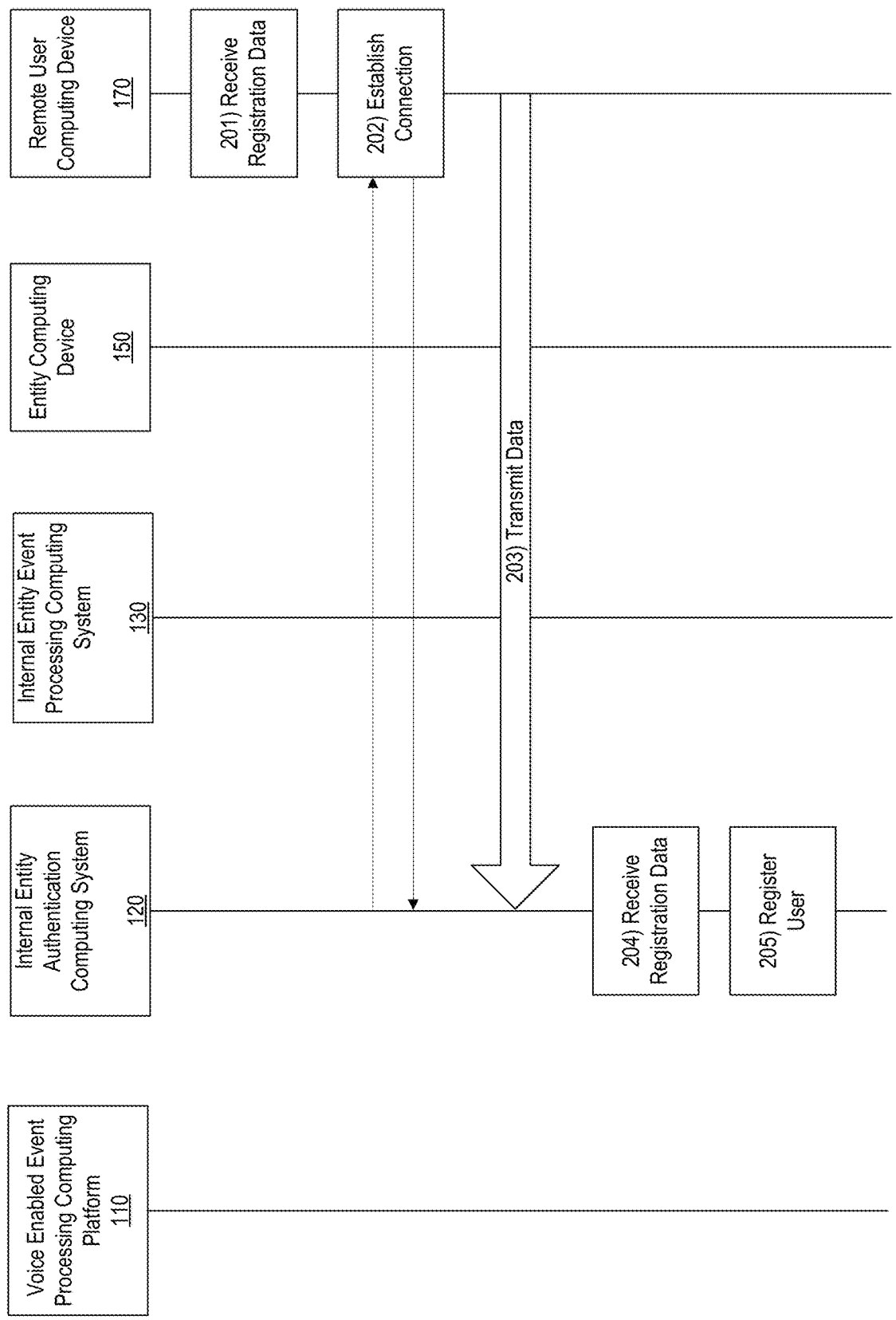

Referring to FIG. 2A, at step 201, registration data may be received by a user device, such as remote user computing device 170. Remote user computing device 170 may be a smartphone, tablet, or the like, associated with a user or customer of the enterprise organization implementing the voice enabled event processing computing platform 110. In some examples, registration data may be provided in response to downloading an application to the device, such as a mobile banking application. The registration information may include user identifying data (name, phone number, address, or the like), authentication data (e.g., username and password, personal identification number, biometric data, or the like), account data (e.g., account numbers associated with one or more user accounts such as checking or savings accounts, credit card information, or the like), device identifying data (e.g., unique identifier of the device), and the like. Registration may enable a user to process one or more events via the application executing on the remote user computing device 170, including voice enabled events as will be discussed herein.

At step 202, a connection may be established between the remote user computing device 170 and the internal entity authentication computing system 120. For instance, a first wireless connection may be established between the remote user computing device 170 and internal entity authentication computing system 120. Upon establishing the first wireless connection, a communication session may be initiated between internal entity authentication computing system 120 and remote user computing device 170.

At step 203, the registration data may be transmitted from the remote user computing device 170 to the internal entity authentication computing system 120. For instance, the registration data may be transmitted during the communication session initiated upon establishing the first wireless connection.

At step 204, the registration data may be received by internal entity authentication computing system 120. At step 205, the user may be registered. For instance, one or more databases may be updated or modified to include data entries for the user being registered.

Figure 2B:
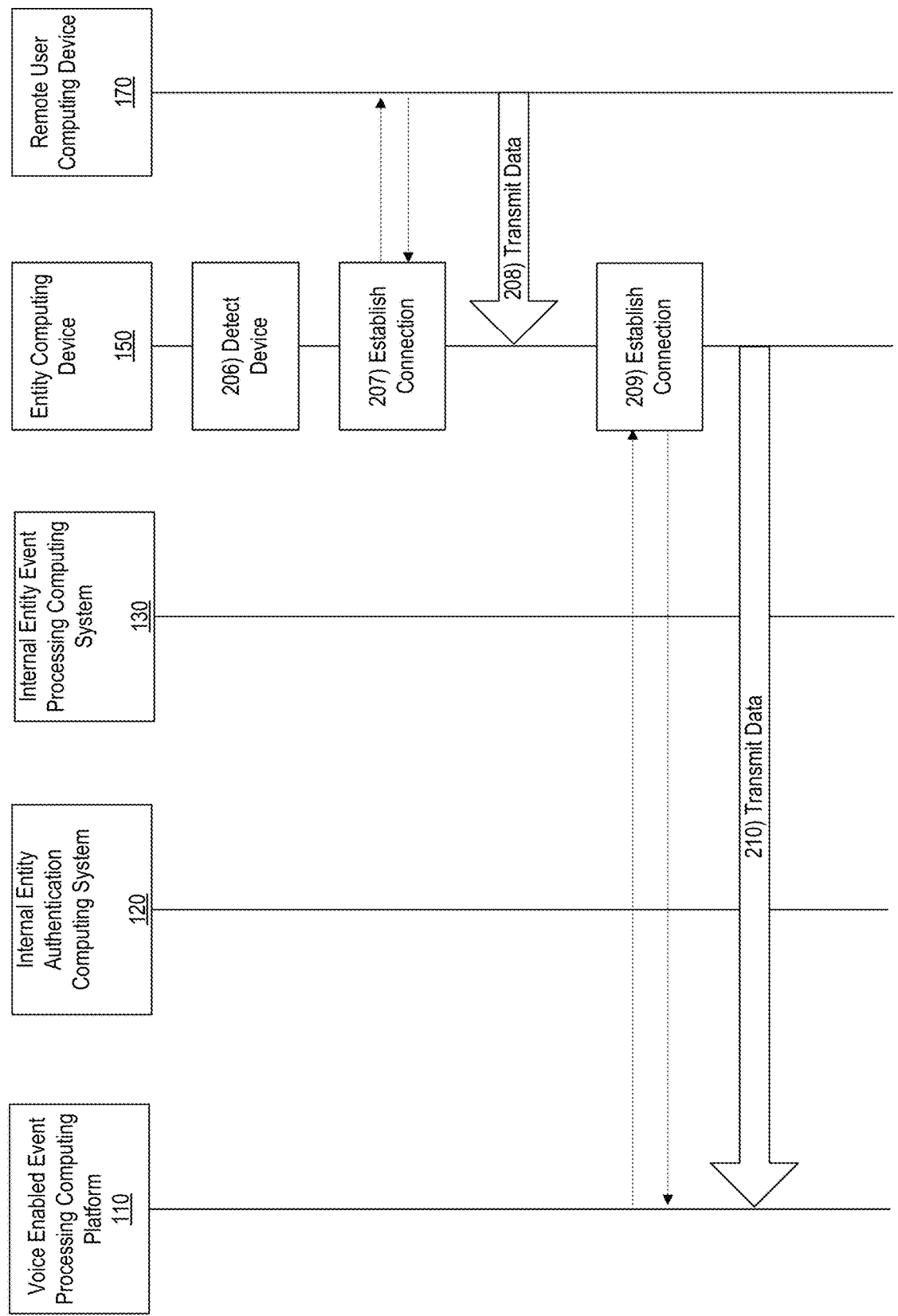

With reference to FIG. 2B, at step 206, a device may be detected by a self-service kiosk (e.g., entity computing device 150) such as an ATM, ATA or the like. In some examples, detecting the device may include entity computing device 150 continuously scanning for signals emitted from a mobile device, such as remote user computing device 170, and detecting a signal when the remote user computing device 170 is within a predefined distance or range of the entity computing device 150. Additionally or alternatively, entity computing device 150 may emit a signal that may be detected by remote user computing device 170 when remote user computing device 170 is within a predefined distance or range of entity computing device 150. In some arrangements, detecting the device may include the entity computing device 150 receiving a request from remote user computing device 170.

At step 207, a connection may be established between the remote user computing device 170 and the entity computing device 150. For instance, a second wireless connection may be established between the remote user computing device 170 and entity computing device 150. In some examples, the connection may be established via near field communication, Bluetooth™ or the like. Upon establishing the second wireless connection, a communication session may be initiated between entity computing device 150 and remote user computing device 170.

At step 208, data may be transmitted from the remote user computing device 170 to the entity computing device 150. For instance, data from the application executing on the remote user computing device 170 may be transmitted to the entity computing device 150. In some examples, the data may include user identifying data, an indication of whether the user is logged in to the application, device identifying data, authentication data, or the like. This data may be used, in some examples, to extract or retrieve user information (e.g., account information, and the like), authenticate the user, and the like.

At step 209, the data may be received by the entity computing device 150 and a connection may be established between the entity computing device 150 and voice enabled event processing computing platform 110. For instance, a third wireless connection may be established between the entity computing device 150 and voice enabled event processing computing platform 110. Upon establishing the third wireless connection, a communication session may be initiated between entity computing device 150 and voice enabled event processing computing platform 110.

At step 210, the data transmitted from the remote user computing device 170 to the entity computing device 150 may be transmitted to the voice enabled event processing computing platform 110. For instance, the data may be transmitted during the communication session initiated upon establishing the third wireless connection.

While FIG. 2B illustrates data being transmitted from the remote user computing device 170 to the entity computing device 150 then to the voice enabled event processing computing platform 110, in some examples, entity computing device 150 and voice enabled event processing computing platform 110 may be a same device and, as such, transmitting the data to the entity computing device 150 would encompass transmitting the data to the voice enabled event processing computing platform 110 (e.g., step 210 may be omitted if the voice enabled event processing computing platform 110 is part of entity computing device 150).

Figure 2C:
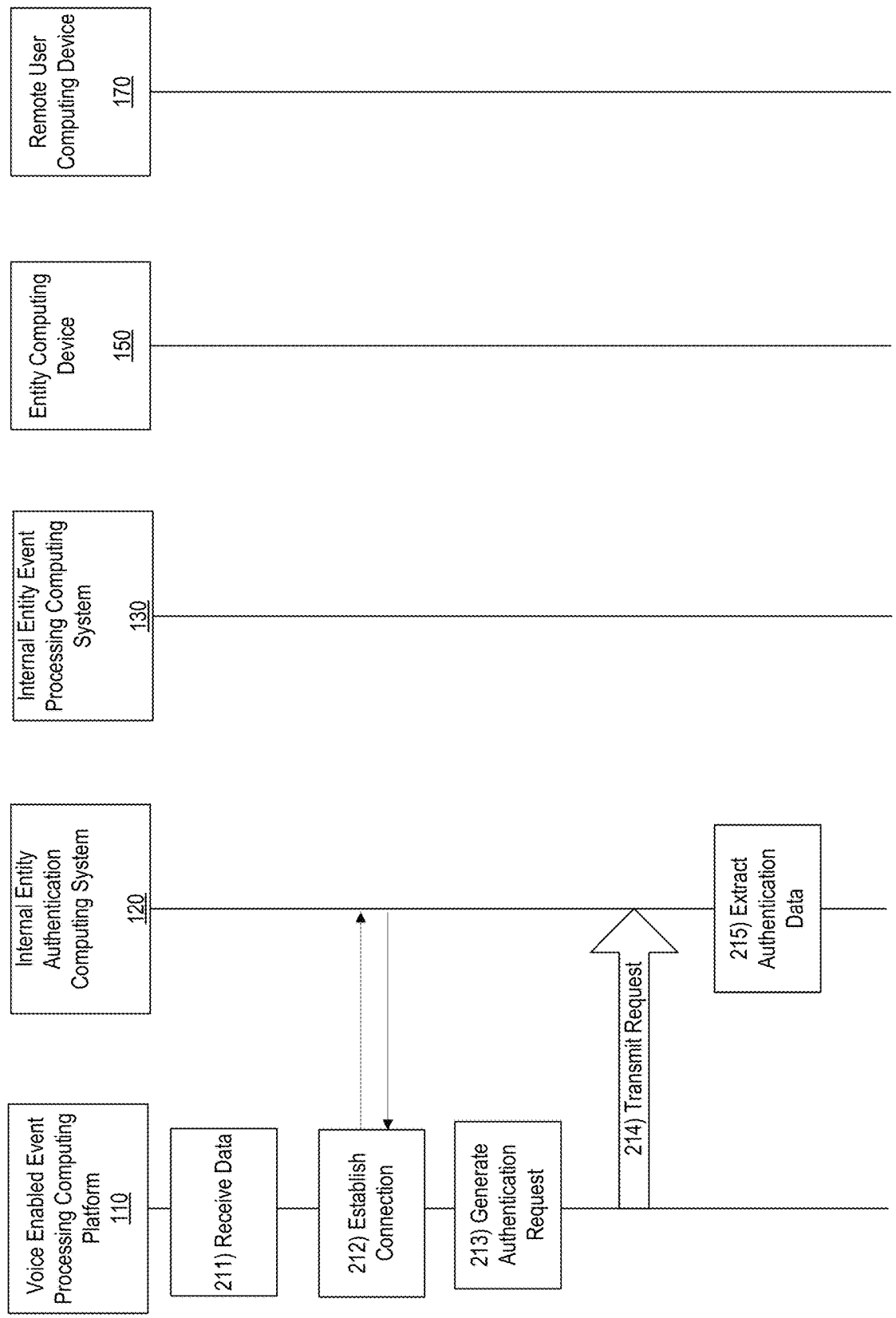

With reference to FIG. 2C, at step 211, the data may be received by the voice enabled event processing computing platform 110.

At step 212, a connection may be established between the voice enabled event processing computing platform 110 and internal entity authentication computing system 120. For instance, a fourth wireless connection may be established between the voice enabled event processing computing platform 110 and the internal entity authentication computing system 120. Upon establishing the fourth wireless connection, a communication session may be initiated between voice enabled event processing computing platform 110 and internal entity authentication computing system 120.

At step 213, an authentication request may be generated. In some examples, based on data received from remote user computing device 700, a request to authenticate a user may be generated. The request may include a request for confirmation that the user is logged in to the application executing on the mobile device, a request for pre-stored authentication data, or the like. The authentication request may include user identifying data, device identifying data, and the like, received from the remote user computing device 170.

At step 214, the request for authentication data may be transmitted from the voice enabled event processing computing platform 110 to the internal entity authentication computing system 120. In some examples, the request for authentication data may be transmitted during the communication session initiated upon establishing the fourth wireless connection.

At step 215, the request for authentication data may be received and authentication response data may be extracted. For instance, the internal entity authentication computing system 120 may extract pre-stored authentication, confirm a login status of a user to the application executing on the mobile device, or the like.

Figure 2D:
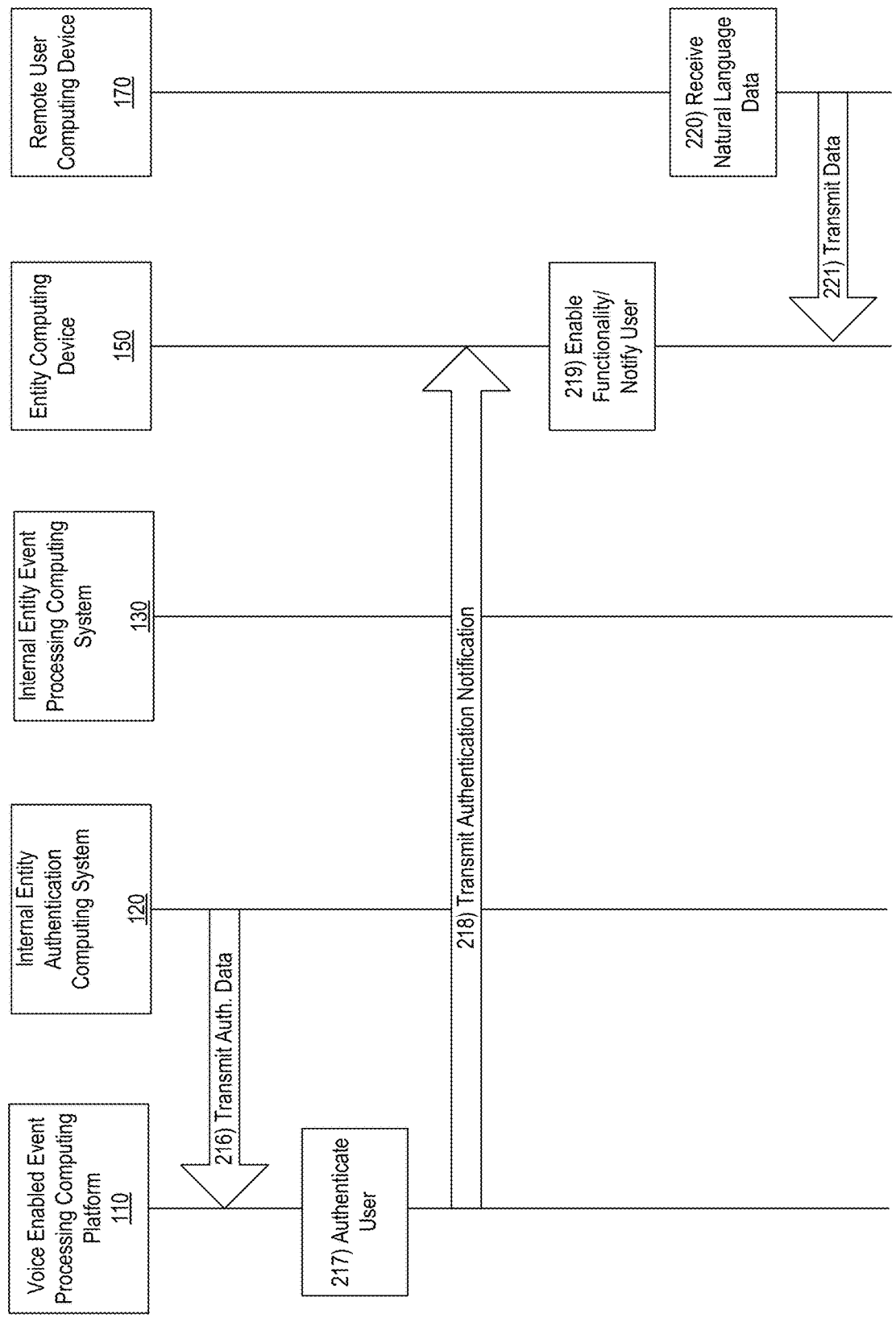

With reference to FIG. 2D, at step 216, the authentication data may be transmitted from the internal entity authentication computing system 120 to the voice enabled event processing computing platform 110. For instance, an indication that the user is logged in to the application executing on the mobile device (e.g., remote user computing device 170) may be transmitted to the voice enabled event processing computing platform 110. Additionally or alternatively, pre-stored authentication data of the user may be transmitted to the voice enabled event processing computing platform 110 for comparison to authentication data received from the user.

At step 217, the user may be authenticated (e.g., based on status with the application executing on the remote user computing device 170), based on received authentication data, or the like.

At step 218, an authentication notification may be generated and transmitted to the entity computing device 150. For instance, an indication that the user is authenticated may be transmitted to the self-service kiosk.

At step 219, based on the user being authenticated, functionality of the entity computing device 150 may be enabled, initiated or activated. For instance, one or more functions of the entity computing device 150 may be enabled and a notification may be displayed to the user that the entity computing device 150 is enabled.

At step 220, natural language data may be received by remote user computing device 170. For instance, the user may speak a desired event processing request (e.g., "withdrawal," "balance transfer," "deposit," "withdraw $100," or the like). The user may direct his or her natural language or speech to the remote user computing device 170 where it may be captured by one or more microphones or other sensors enabled on the device. In some examples, the application executing on the mobile device may enable the microphone or other sensors in response to, for instance, a user request, a connection to the entity computing device 150, or the like.

At step 221, the received natural language data may be transmitted from the remote user computing device 170 to the entity computing device 150.

Figure 2E:
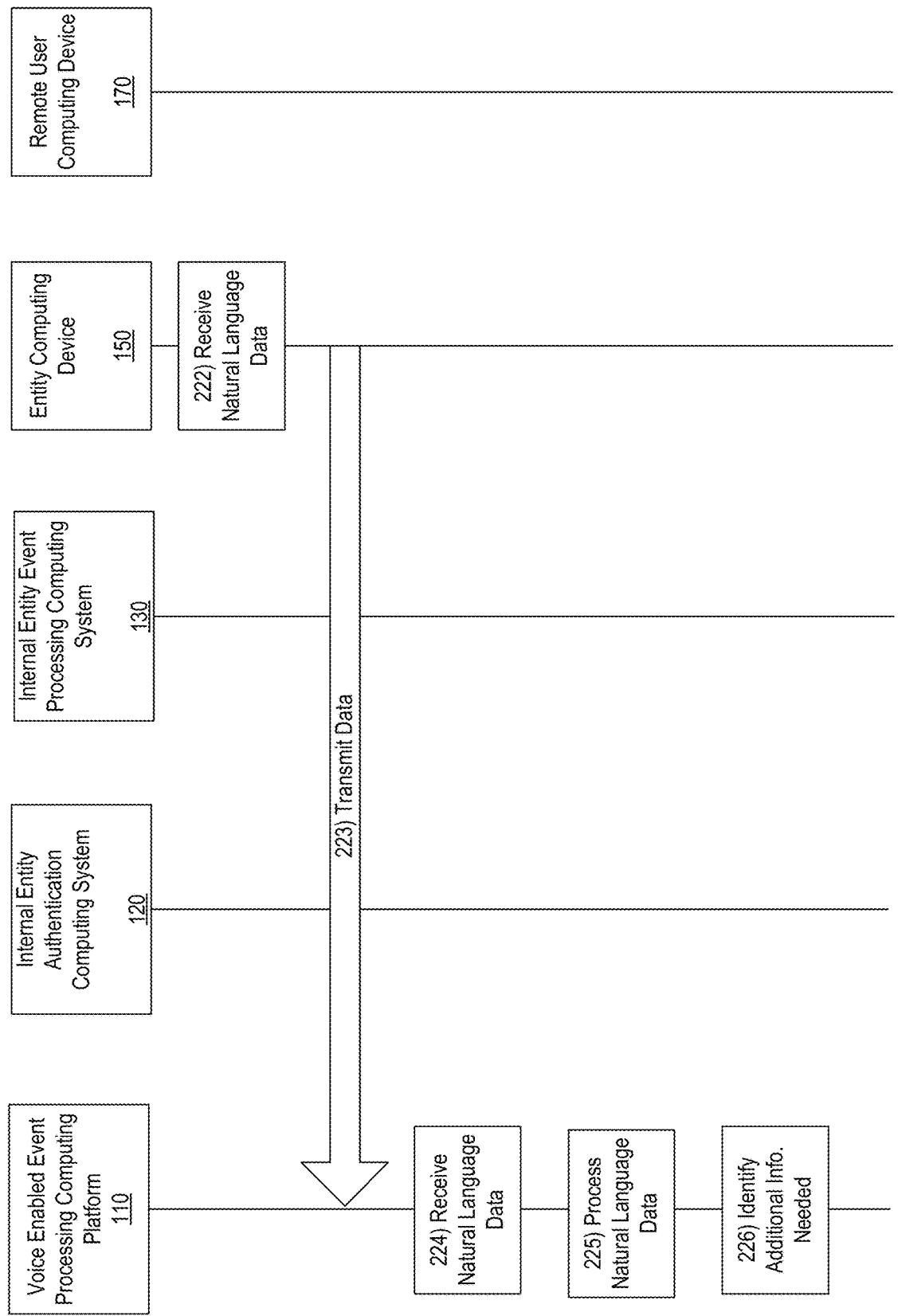

With reference to FIG. 2E, at step 222, the natural language data may be received by the entity computing device 150. At step 223, the natural language data may be transmitted by the entity computing device 150 to the voice enabled event processing computing platform 110. At step 224, the natural language data may be received by voice enabled event processing computing platform 110.

In some examples, the voice enabled event processing computing platform 110 may be part of a same device as the entity computing device 150. Accordingly, step 223 may be omitted if the natural language data is received by the voice enabled event processing computing platform 110 when it is received by the entity computing device 150.

At step 225, the natural language data may be processed by the voice enabled event processing computing platform 110. For instance, the natural language data may be converted to text or may be further processed to identify an event requested for processing. Based on the processed natural language data, a determination as to whether additional information is needed may be made at step 226. For instance, if the processed natural language data indicates the event requested is "withdraw $50," the voice enabled event processing computing platform 110 may determine that additional information including an account from which to withdraw the funds (e.g., checking, savings, or the like) may be needed.

Figure 2F:
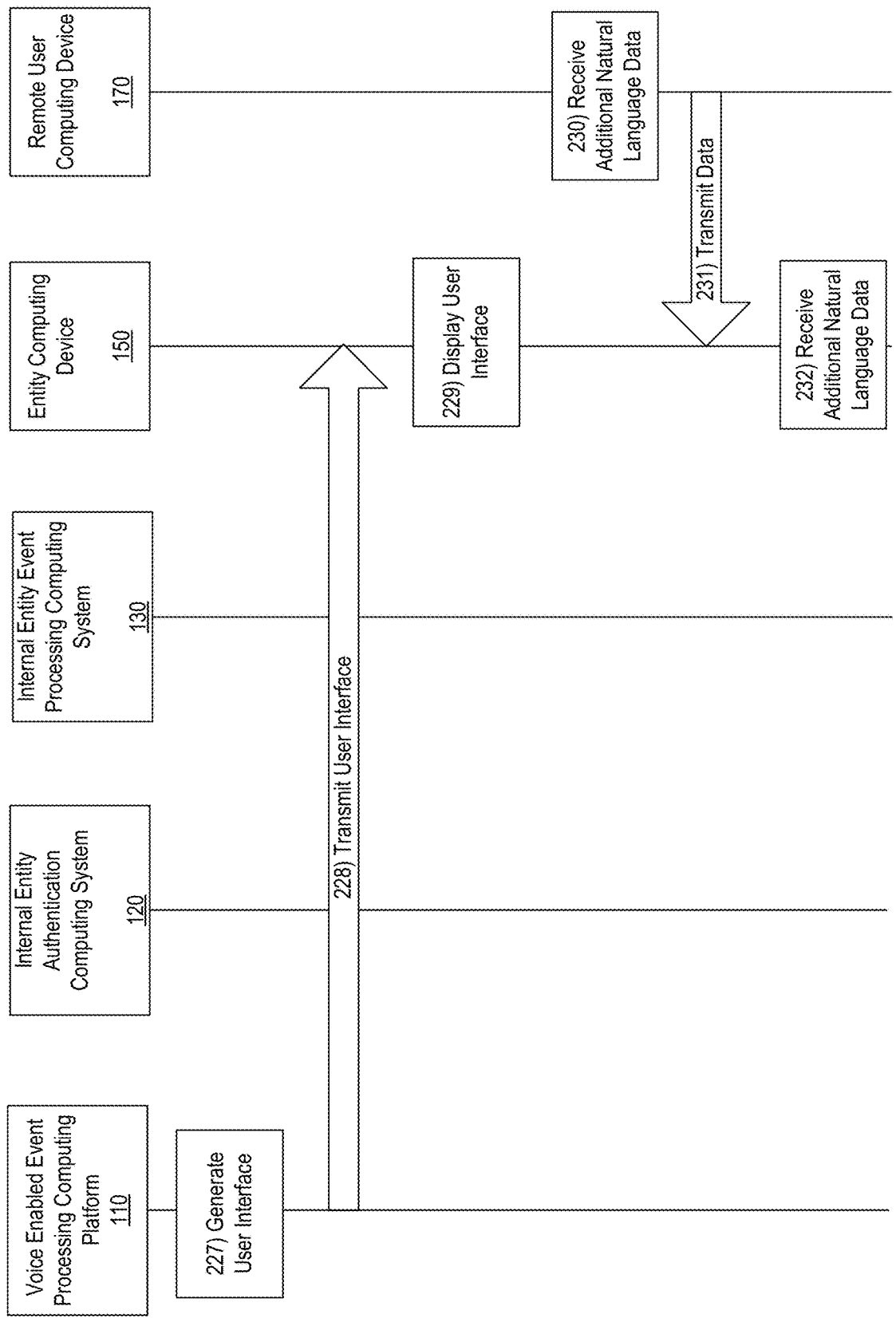
Figure 3:
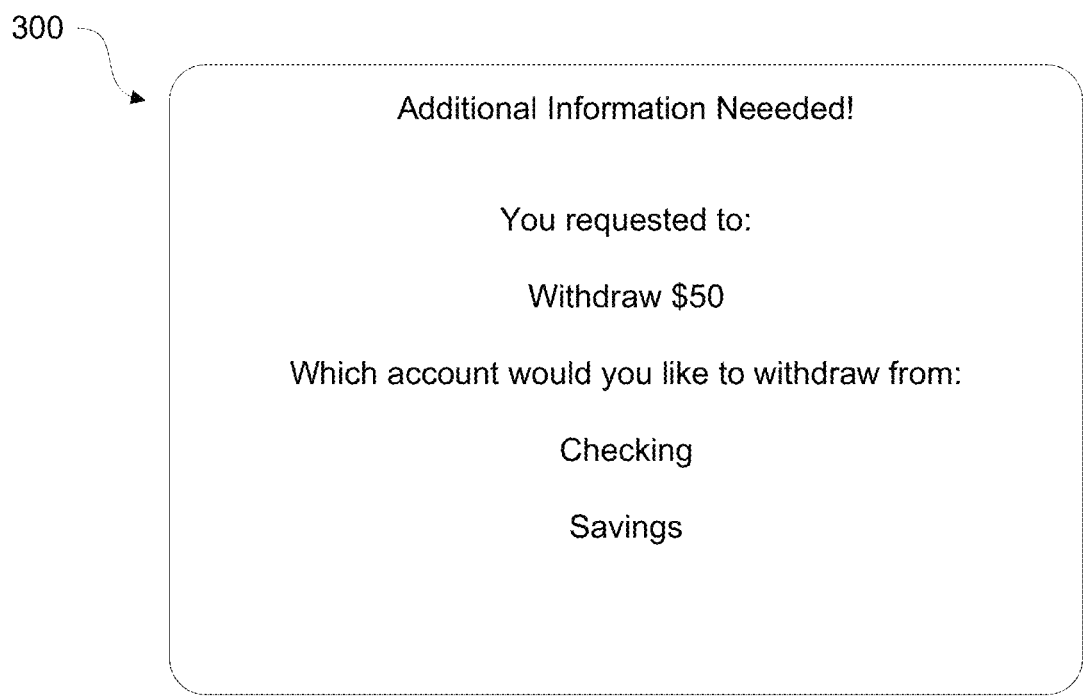
FIG. 3 illustrates one example user interface that may be generated and displayed in accordance with one or more aspects described herein.

Accordingly, at step 227 in FIG. 2F, a user interface may be generated. The user interface may include a prompt requesting the user to identify an account from which to withdraw the funds. FIG. 3 illustrates one example user interface in which a user is prompted to provide additional information. The user interface 300 includes identification of the event requested, as well as options for different accounts the user may select.

At step 228, the user interface may be transmitted from the voice enabled event processing computing platform 110 to the entity computing device 150. At step 229, the user interface may be received by entity computing device 150 and displayed by a display of entity computing device 150.

At step 230, in response to the user interface being displayed on the display of entity computing device 150, the user may provide additional natural language data to the remote user computing device 170. For instance, the user may read the options available from the display of the entity computing device 150 and provide natural language input including selection of an option displayed via the remote user computing device 170. The natural language data may be captured via the application executing on the remote user computing device 170.

At step 231, the additional natural language data may be transmitted from the remote user computing device 170 to the entity computing device 150. At step 232, the additional natural language data may be received by the entity computing device 150.

With reference to FIG. 2G, at step 233, the additional natural language data may be transmitted by the entity computing device 150 to the voice enabled event processing computing platform 110. In examples in which the voice enabled event processing computing platform 110 is part of the entity computing device 150, step 233 may be omitted.

At step 234, the additional natural language data may be received by voice enabled event processing computing platform 110 and processed. For instance, the natural language data may be evaluated to identify a selection made by the user in response to the request for additional information displayed in the user interface.

At step 235, a connection may be established between the voice enabled event processing computing platform 110 and internal entity event processing computing system 130. For instance, a fifth wireless connection may be established between the voice enabled event processing computing platform 110 and the internal entity event processing computing system 130. Upon establishing the fifth wireless connection, a communication session may be initiated between voice enabled event processing computing platform 110 and internal entity event processing computing system 130.

At step 236, voice enabled event processing computing platform 110 may generate an event processing request. For instance, based on the processed natural language data and additional natural language data, a request to process the requested event may be generated. The request may include event details (e.g., type of event, amount of event, user associated with event, account associated with event, and the like).

At step 237, the voice enabled event processing computing platform 110 may transmit the event processing request to the internal entity event processing computing system 130. At step 238, the event request may be received by the internal entity event processing computing system 130.

With reference to FIG. 2H, at step 239, internal entity event processing computing system 130 may generate event processing response data. For instance, internal entity event processing computing system 130 may, as a backend system, process the requested event. In some examples, processing the event may include identifying associated account(s), modifying ledger(s) associated with the account(s), and the like. Once the event has been processed by the internal entity event processing computing system 130, event processing response data including an indication that the event was processed may be generated. In some examples, the event processing response data may include an indication of additional processes to execute (e.g., distribute funds, or the like).

At step 240, the internal entity event processing computing system 130 may transmit the event processing response data to the voice enabled event processing computing platform 110.

At step 241, the voice enabled event processing computing platform 110 may receive the event processing response data and, at step 242, may generate one or more event processing commands. For instance, based on the indication that the event was processed, voice enabled event processing computing platform 110 may generate one or more instructions or commands to execute one or more event processing functions (e.g., distribute funds, or the like).

At step 243, the voice enabled event processing computing platform 110 may transmit the generated event processing commands or instructions to the entity computing device 150.

Figure 2I:
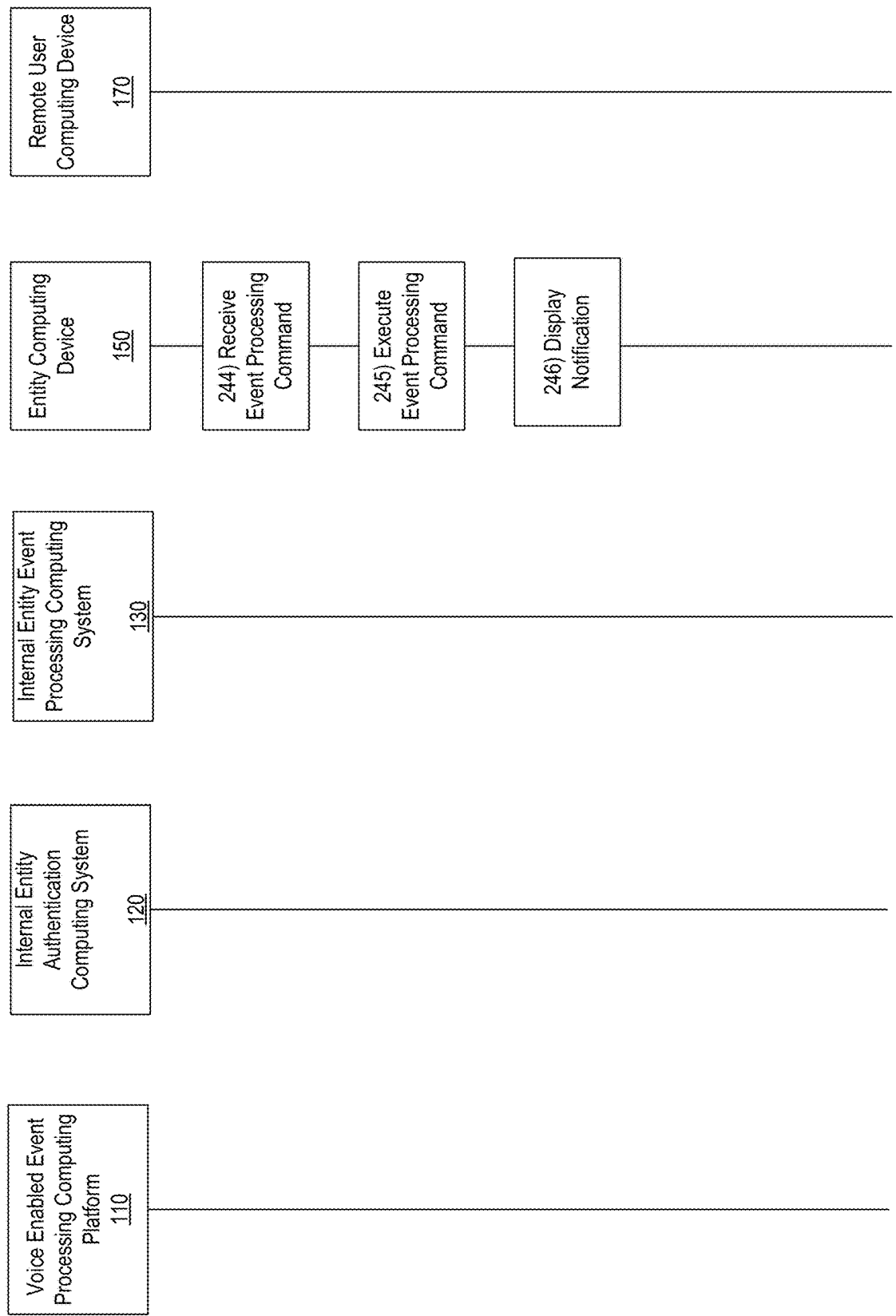

With reference to FIG. 2I, at step 244, the entity computing device 150 may receive the event processing commands or instructions. At step 245, the entity computing device 150 may execute the event processing commands or instructions. For instance, executing the event processing commands or instructions may cause the entity computing device 150 to perform or execute one or more functions, such as distributing funds, activating a receptacle for receiving deposits, or the like.

At step 246, a notification indicating that the event was processed may be generated and displayed by a display of the entity computing device 150.

Figure 4:
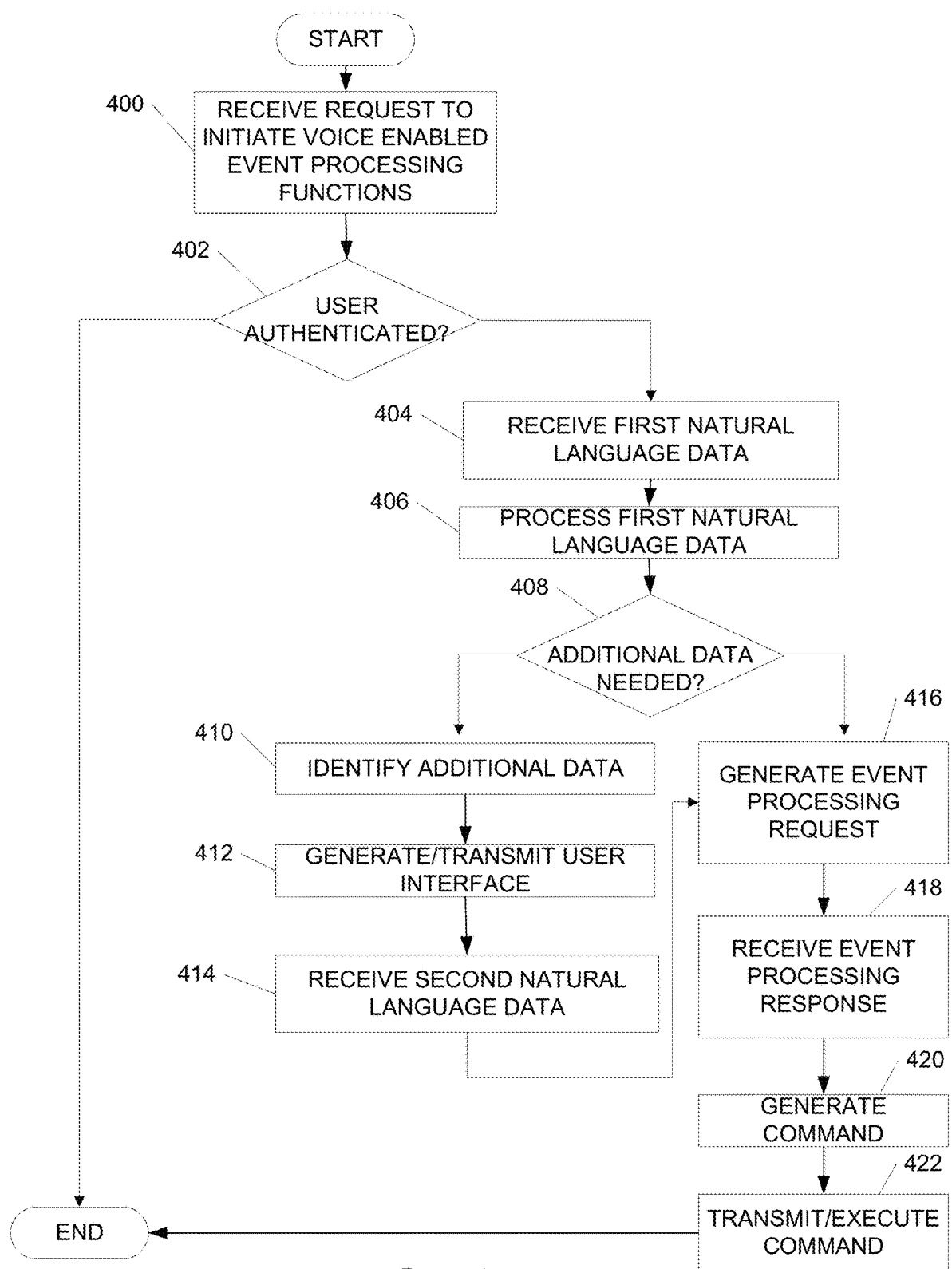
FIG. 4 depicts an illustrative method for implementing voice enabled event processing functions according to one or more aspects described herein.

FIG. 4 is a flow chart illustrating one example method of implementing voice enabled event processing functions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, the voice enabled event processing computing platform 110 may receive a request to initiate voice enabled event processing. In some examples, the request to initiate voice enabled event processing may be received from a self-service kiosk, such as an ATM, ATA, or the like (e.g., entity computing device 150). The request to initiate voice enabled event processing may include data from a user device that has been detected as within a predefined range, distance or proximity of the self-service kiosk.

At step 402, the voice enabled event processing computing platform 110 may determine whether the user associated with the user device is authenticated. For instance, the voice enabled event processing computing platform 110 may request authentication data from internal entity authentication computing system 120. In some examples, the authentication data requested may include an indication that the user is currently logged in to an application, such as a mobile banking application, executing on the user device. Additionally or alternatively, authentication data may be requested from the user and compared to pre-stored data requested and received from the internal entity authentication computing system 120.

If, at step 402, the user is not authenticated, the process may end. In some examples, a notification may be generated and transmitted to the self-service kiosk for display indicating that the user is not authenticated.

If, at step 402, the user is authenticated, first natural language data may be received from the user device at step 404. For instance, the self-service kiosk may connect to the user device (e.g., via near field communication, Bluetooth™, or the like) and may receive first natural language data requesting event processing and captured via the user device. The first natural language data may be transmitted to or otherwise received by voice enabled event processing computing platform 110.

At step 406, the first natural language data may be processed to identify a requested event. For instance, a type of event may be identified from the processed first natural language data. Any additional details available (e.g., amount, or the like) may be identified from the processed first natural language data.

At step 408, a determination may be made as to whether additional data is needed to process the event. For instance, voice enabled event processing computing platform 110 may determine, based on the data identified from the processed first natural language data, whether all information needed to process the event has been received. If not, additional information may be identified at step 410. For instance, if event details such as an amount, account associated with the event, or the like, are identified as missing, that information may be identified as additional information to be requested from the user.

At step 412, a user interface requesting the additional information from the user may be generated and transmitted to the self-service kiosk for display on a display of the self-service kiosk. At step 414, second natural language data may be received from the user device. In some examples, the second natural language data may be received from the user device by the self-service kiosk and transmitted to the voice enabled event processing computing platform 110. The second natural language data may include voice data indicating the additional information requested via the user interface (e.g., additional information response data).

After receiving the second natural language data, or in response to determining at step 408 that additional data is not needed, at step 416, an event processing request may be generated. The event processing request may include event details, including any additional information, captured from the natural language received and processed. The event processing request may be transmitted to an internal system to process the event (e.g., update accounts, modify ledgers, and the like).

At step 418, event processing response data may be received. For instance, an indication that the event has been processed may be received.

At step 420, one or more event processing instructions or commands may be generated. For instance, one or more event processing instructions or commands to be executed by the self-service kiosk to complete the event processing may be generated.

At step 422, the generated one or more instructions or commands may be transmitted to the self-service kiosk and executed by the self-service kiosk.

Figure 5:
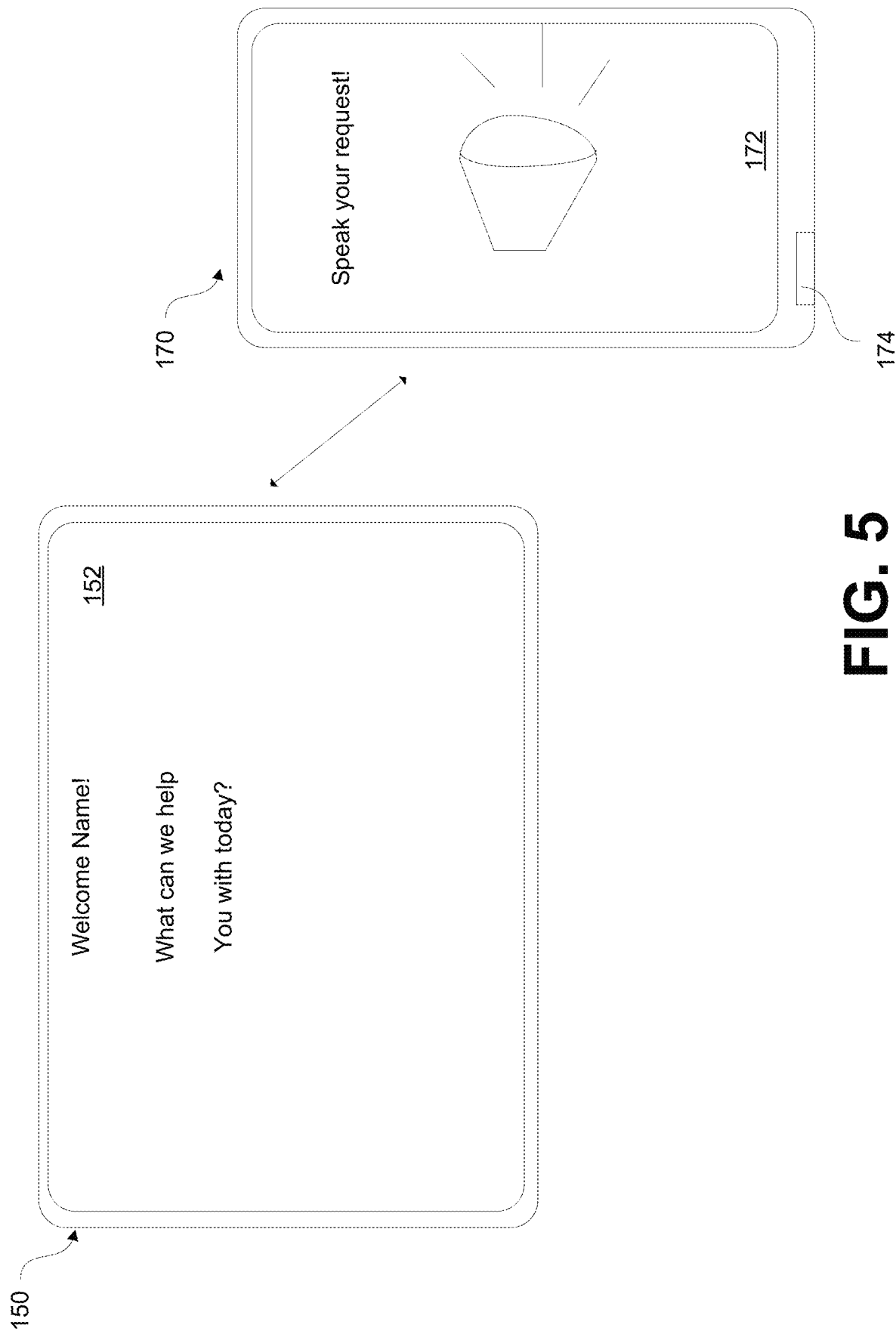
FIG. 5 depicts an example computing environment for implementing voice enabled event processing functions in accordance with one or more aspects described herein.

FIG. 5 is a schematic illustration of a client-facing portion of the arrangements described herein. As shown in FIG. 5, entity computing device 150 may be a self-service kiosk, such as an ATM, ATA, or the like having a display 152 for displaying one or more user interfaces. Further, remote user computing device 170 may be a user smartphone, tablet or the like and may include a display 172 for displaying one or more user interfaces. Remote user computing device 170 may further include a microphone 174 or other sensor for capturing natural language or other audio data. Accordingly, remote user computing device 170 may include an application executing on the device and configured to capture natural language data and transmit the data to the entity computing device 150 (e.g., via a network). In some examples, as discussed herein, the user may read information provided via the user interface displayed on the display 152 and may respond with natural language input captured by the microphone 174 of the remote user computing device 170 and transmitted for processing.

As discussed herein, arrangements that enable use of a voice recognition system to facilitate communication and event processing between a user and the self-service kiosk would be advantageous. For instance, by reducing or eliminating contact with the self-service kiosk, the user may maintain a more hygienic experience. Further, some unauthorized actors may attempt to use a proxy keypad on a self-service kiosk. By using voice commands and natural language captured by the user device and transmitted, via the wireless connection, to the self-service kiosk and/or voice enabled event processing computing platform 110, the user may bypass the keypad and avoid potential exposure to unauthorized use or misuse or a user's data.

While many arrangements discussed herein are directed to a user being within a predefined proximity of the self-service kiosk, in some examples, a user may pre-stage the event for processing using voice commands or natural language input into the user device. For instance, natural language or voice commands may be input to the user device (e.g., captured by the application executing on the mobile device) and may be used to pre-stage an event (e.g., set up all aspects of the event but not complete processing). Pre-staging the event may include authenticating the user (e.g., as discussed herein), obtaining event information, and the like. In some examples, a machine-readable code, such as a QR code, may be generated with event details. The QR code may be transmitted to the user device or other device (e.g., user device of a second user authorized to complete the event by the user). The second user may then take his or her user device to a self-service kiosk (e.g., any self-service kiosk associated with the enterprise organization), scan the machine-readable code and the event may be processed as discussed herein (e.g., event details transmitted to internal entity event processing computing system 130, event processed, event processing commands generated and executed, and the like). Accordingly, user's who have caregivers or are unable to visit the self-service kiosk personally may use the voice enabled functionality from his or her mobile device and have the event processed by another user authorized by the user and based on the generated code.

The self-service kiosk may receive the notification and instruction and the instruction may be executed. For instance, the self-service kiosk may dispense the requested funds. In some examples, the self-service kiosk may generate a user interface indicating that the event was successfully processed. The notification may be displayed on a display of the self-service kiosk, on a display of the mobile device, or the like.

In some examples, after processing the event, the self-service kiosk may generate a request for instructions regarding whether additional events are requested. Additionally or alternatively, after processing the event, the connection between the self-service kiosk and the mobile device may be terminated.

Accordingly, the arrangements discussed herein enable processing of events, such as various transactions, at a self-service kiosk, while minimizing contact of the user with the self-service kiosk. Accordingly, a more hygienic event processing experience may be provided to the user because the user may speak one or more requests or commands and those voice requests may be transmitted to the self-service kiosk for processing.

Further, the arrangements described herein may prevent or reduce occurrences of unauthorized activity. For instance, unauthorized actors may install a proxy keypad on a self-service kiosk, may use a skimming device on a card reader device, or the like. By reducing or eliminating the need to input data (e.g., PIN, user information, or the like) via the keypad of the self-service kiosk, or swipe a card through a card reader, the voice recognition system may prevent unauthorized capture of user data and/or any subsequent unauthorized activity.

Although aspects discussed herein are described in the context of a withdrawal of funds, various other self-service kiosk transactions or events may be processed, such as cash deposits, check deposits, person-to-person funds transfers, and the like.

Figure 6:
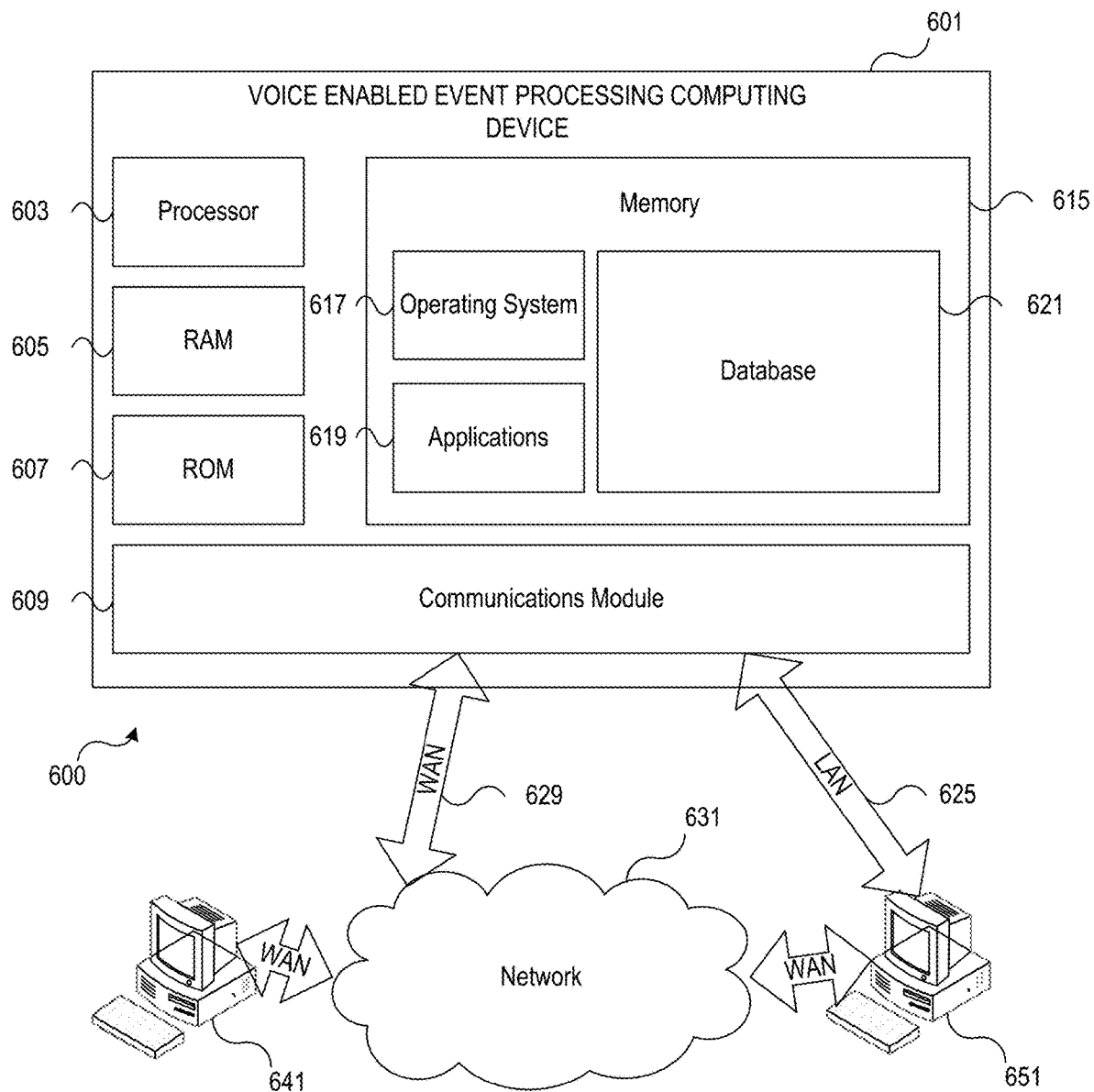
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include voice enabled event processing computing device 601 having processor 603 for controlling overall operation of voice enabled event processing computing device 601 and its associated components, including Random Access Memory (RAM) 605, Read-Only Memory (ROM) 607, communications module 609, and memory 615. Voice enabled event processing computing device 601 may include a variety of computer readable media. Computer readable media may be any available media that may be accessed by voice enabled event processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by voice enabled event processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on voice enabled event processing computing device 601. Such a processor may execute computer-executable instructions stored on a computer-readable medium.

Software may be stored within memory 615 and/or storage to provide instructions to processor 603 for enabling voice enabled event processing computing device 601 to perform various functions as discussed herein. For example, memory 615 may store software used by voice enabled event processing computing device 601, such as operating system 617, application programs 619, and associated database 621. Also, some or all of the computer executable instructions for voice enabled event processing computing device 601 may be embodied in hardware or firmware. Although not shown, RAM 605 may include one or more applications representing the application data stored in RAM 605 while voice enabled event processing computing device 601 is on and corresponding software applications (e.g., software tasks) are running on voice enabled event processing computing device 601.

Communications module 609 may include a microphone, keypad, touch screen, and/or stylus through which a user of voice enabled event processing computing device 601 may provide input, and may also include one or more of a speaker for providing audio output and a video display device for providing textual, audiovisual and/or graphical output. Computing system environment 600 may also include optical scanners (not shown).

Voice enabled event processing computing device 601 may operate in a networked environment supporting connections to one or more remote computing devices, such as computing devices 641 and 651. Computing devices 641 and 651 may be personal computing devices or servers that include any or all of the elements described above relative to voice enabled event processing computing device 601.

The network connections depicted in FIG. 6 may include Local Area Network (LAN) 625 and Wide Area Network (WAN) 629, as well as other networks. When used in a LAN networking environment, voice enabled event processing computing device 601 may be connected to LAN 625 through a network interface or adapter in communications module 609. When used in a WAN networking environment, voice enabled event processing computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
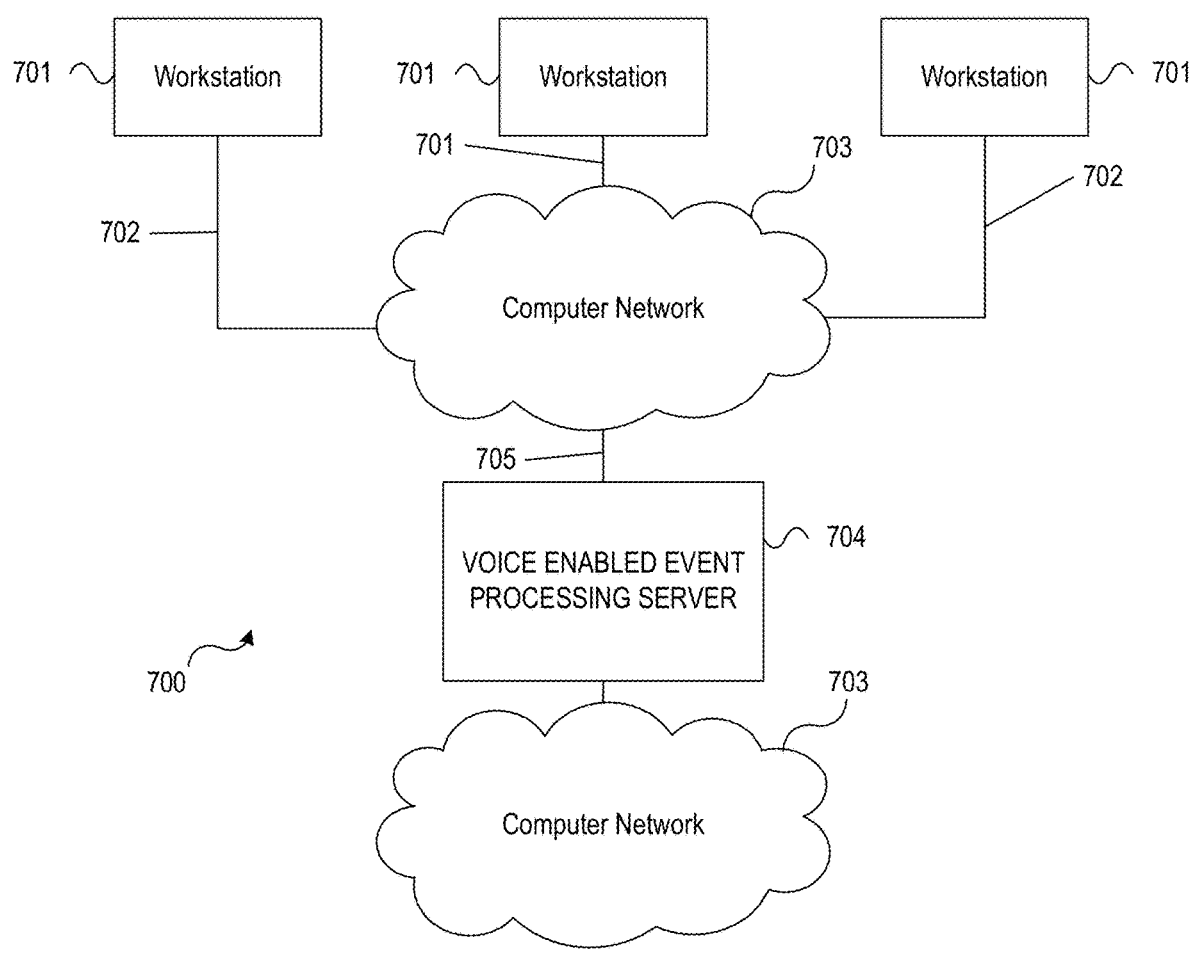
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to voice enabled event processing server 704. In system 700, voice enabled event processing server 704 may be a server, processor, computer, or data processing device, or combination of the same, configured to perform the functions and/or processes described herein. Server 704 may be used to receive requests to initiate voice enabled functions, confirm authentication of a user, process natural language data received, determine whether additional information is needed, generate an event processing request, generate event processing commands, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and voice enabled event processing server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, from a self-service kiosk associated with an enterprise organization, a request to initiate voice enabled event processing functions, the request to initiate voice enabled event processing functions including data associated with a user device detected by the self-service kiosk;
authenticate a user associated with the user device based on the data associated with the user device, wherein authenticating the user associated with the user device based on the data associated with the user device includes authenticating the user based on an indication that the user is currently logged in to an application associated with the enterprise organization and currently executing on the user device;
after authenticating the user, receive, from the user device, natural language data including a request to process an event;
process the natural language data to identify the event;
generate an event processing request including details of the identified event;
transmit the event processing request to an event processing computing system;
receive, from the event processing computing system, an indication that the event was processed;
generate, based on the indication that the event was processed, one or more event processing commands;
transmit, to the self-service kiosk, the one or more event processing commands; and
cause the one or more event processing commands to execute at the self-service kiosk.

2. The computing platform of claim 1, further including instructions that, when executed, cause the computing platform to:
based on the identified event, identify additional information to process the event;
generate a user interface including a request for the additional information, wherein the request includes a request to identify an account from which to withdraw funds;
transmit, to the self-service kiosk, the user interface; and
cause the user interface to display on a display of the self-service kiosk.

3. The computing platform of claim 2, further including instructions that, when executed, cause the computing platform to:
responsive to causing the user interface to display on the display of the self-service kiosk, receive, from the user device, additional natural language data, the additional natural language data including the additional information including the account from which to withdraw funds; and
generate the event processing request based on the additional information including the identified account from which to withdraw funds.

4. The computing platform of claim 1, wherein the request to process the event includes a request to withdraw funds from the self-service kiosk and wherein the one or more event processing commands cause the self-service kiosk to dispense the funds.

5. The computing platform of claim 1, wherein the details of the identified event include at least one of: a type of event, amount of event, or account associated with the event.

6. The computing platform of claim 1, wherein the event processing computing system is configured to process the event including modifying one or more ledgers associated with an account associated with the event.

7. A method, comprising:
receiving, by a computing platform, the computing platform having at least one processor and memory, and from a self-service kiosk associated with an enterprise organization, a request to initiate voice enabled event processing functions, the request to initiate voice enabled event processing functions including data associated with a user device detected by the self-service kiosk;
authenticating, by the at least one processor, a user associated with the user device based on the data associated with the user device, wherein authenticating the user associated with the user device based on the data associated with the user device includes authenticating the user based on an indication that the user is currently logged in to an application associated with the enterprise organization and currently executing on the user device;
after authenticating the user, receiving by the at least one processor and from the user device, natural language data including a request to process an event;
processing, by the at least one processor, the natural language data to identify the event;
generating, by the at least one processor, an event processing request including details of the identified event;
transmitting, by the at least one processor, the event processing request to an event processing computing system;
receiving, by the at least one processor and from the event processing computing system, an indication that the event was processed;
generating, by the at least one processor and based on the indication that the event was processed, one or more event processing commands;
transmitting, by the at least one processor and to the self-service kiosk, the one or more event processing commands; and
causing, by the at least one processor, the one or more event processing commands to execute at the self-service kiosk.

8. The method of claim 7, further including:
based on the identified event, identifying, by the at least one processor, additional information to process the event;
generating, by the at least one processor, a user interface including a request for the additional information, wherein the request includes a request to identify an account from which to withdraw funds;
transmitting, by the at least one processor and to the self-service kiosk, the user interface; and
causing, by the at least one processor, the user interface to display on a display of the self-service kiosk.

9. The method of claim 8, further including:
responsive to causing the user interface to display on the display of the self-service kiosk, receiving, by the at least one processor and from the user device, additional natural language data, the additional natural language data including the additional information including the account from which to withdraw funds; and
generating, by the at least one processor, the event processing request based on the additional information including the account from which to withdraw funds.

10. The method of claim 7, wherein the request to process the event includes a request to withdraw funds from the self-service kiosk and wherein the one or more event processing commands cause the self-service kiosk to dispense the funds.

11. The method of claim 7, wherein the details of the identified event include at least one of: a type of event, amount of event, or account associated with the event.

12. The method of claim 7, wherein the event processing computing system is configured to process the event including modifying one or more ledgers associated with an account associated with the event.

13. One or more non-transitory computer-readable media storing instructions that, when executed by a computing platform comprising at least one processor, memory, and a communication interface, cause the computing platform to:
receive, from a self-service kiosk associated with an enterprise organization, a request to initiate voice enabled event processing functions, the request to initiate voice enabled event processing functions including data associated with a user device detected by the self-service kiosk;
authenticate a user associated with the user device based on the data associated with the user device, wherein authenticating the user associated with the user device based on the data associated with the user device includes authenticating the user based on an indication that the user is currently logged in to an application associated with the enterprise organization and currently executing on the user device;
after authenticating the user, receive, from the user device, natural language data including a request to process an event;
process the natural language data to identify the event;
generate an event processing request including details of the identified event;
transmit the event processing request to an event processing computing system;
receive, from the event processing computing system, an indication that the event was processed;
generate, based on the indication that the event was processed, one or more event processing commands;
transmit, to the self-service kiosk, the one or more event processing commands; and
cause the one or more event processing commands to execute at the self-service kiosk.

14. The one or more non-transitory computer-readable media of claim 13, further including instructions that, when executed, cause the computing platform to:
based on the identified event, identify additional information to process the event;
generate a user interface including a request for the additional information, wherein the request includes a request to identify an account from which to withdraw funds;
transmit, to the self-service kiosk, the user interface; and
cause the user interface to display on a display of the self-service kiosk.

15. The one or more non-transitory computer-readable media of claim 14, further including instructions that, when executed, cause the computing platform to:
responsive to causing the user interface to display on the display of the self-service kiosk, receive, from the user device, additional natural language data, the additional natural language data including the additional information including the account from which to withdraw funds; and
generate the event processing request based on the additional information including the account from which to withdraw funds.

16. The one or more non-transitory computer-readable media of claim 13, wherein the request to process the event includes a request to withdraw funds from the self-service kiosk and wherein the one or more event processing commands cause the self-service kiosk to dispense the funds.

17. The one or more non-transitory computer-readable media of claim 13, wherein the details of the identified event include at least one of: a type of event, amount of event, or account associated with the event.

18. The one or more non-transitory computer-readable media of claim 13, wherein the event processing computing system is configured to process the event including modifying one or more ledgers associated with an account associated with the event.

* * * * *